United States Patent [19]

Reichle

[11] 3,995,083

[45] Nov. 30, 1976

[54] ELECTRICAL DISCHARGE RECORDING MEDIUM, PARTICULARLY ALUMINIZED PAPER FOR RECORDING, AND METHOD

[75] Inventor: Rolf Reichle, Stuttgart, Germany

[73] Assignee: Robert Bosch G.m.b.H., Stuttgart, Germany

[22] Filed: Aug. 23, 1974

[21] Appl. No.: 500,038

[30] Foreign Application Priority Data

Sept. 5, 1973 Germany.......................... 2344654

[52] U.S. Cl. .............................. 428/207; 346/135; 427/250; 427/258; 427/288; 428/187; 428/204; 428/209; 428/211
[51] Int. Cl.² ...................... B32B 3/00; B32B 7/00
[58] Field of Search ............... 117/12, 15, 38, 36.7, 117/217, 212; 428/204, 187, 457, 464, 206, 207, 209, 211; 427/258, 288, 250; 346/135

[56] References Cited
UNITED STATES PATENTS

| | | | |
|---|---|---|---|
| 3,001,886 | 9/1961 | Shrewsbury et al. ........... | 428/209 X |
| 3,196,031 | 7/1965 | Unmuth............................. | 117/15 |
| 3,463,651 | 8/1969 | Warsager........................... | 117/15 X |
| 3,653,938 | 4/1972 | Obuchi et al. .................... | 117/15 |
| 3,694,241 | 9/1972 | Guthrie et al..................... | 117/15 |
| 3,789,425 | 1/1974 | Matsushima....................... | 346/135 |
| 3,819,397 | 6/1974 | Ehrhardt et al................... | 106/31 X |
| 3,860,547 | 1/1975 | Faessinger et al. ............... | 117/15 X |

FOREIGN PATENTS OR APPLICATIONS 2,204,509    8/1973    Germany

Primary Examiner—Lorraine T. Kendell
Attorney, Agent, or Firm—Flynn & Frishauf

[57] ABSTRACT

A paper carrier substrate, has a contrasting layer applied thereto which thereafter is aluminized; in accordance with the invention, this contrasting layer is ordinary printing ink, which has a somewhat rough surface, permitting excellent adhesion of the metallized layer. In places where no ink is applied, the metallized layer will corrode off, thus leaving non-metallized markings. The ink is preferably applied by gravure or intaglio printing on the substrate, at a speed of between 5 to 9 m/sec., the printing roller being free from etchings where markings are to appear.

5 Claims, 1 Drawing Figure

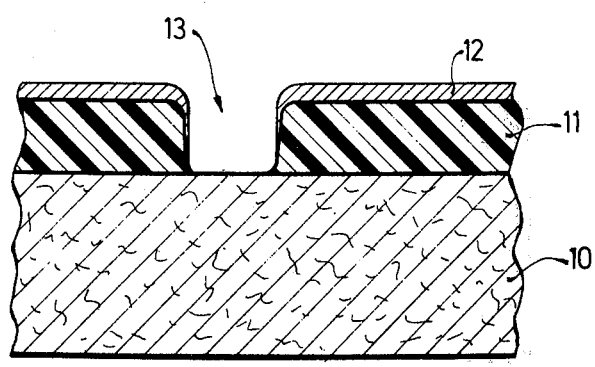

ELECTRICAL DISCHARGE RECORDING MEDIUM, PARTICULARLY ALUMINIZED PAPER FOR RECORDING, AND METHOD

The present invention relates to a recording medium, and more particularly to recording paper which is metallized, preferably with aluminum, which is evaporated on an intermediate layer placed on the paper substrate, the coating being capable of being burned off by an electrical discharge; and to a method of making the recording medium.

Recording paper is known in which the paper carrier has black cellulose, or nitro-lacquer applied by an application roller, in a continuous cellulose roller lacquering step. Recording, as well as readability of the recorded paper, that is, principally the contrast between recorded and non-recorded sections is not always satisfactory in such papers.

It is an object of the present invention to provide a metallized register or recording paper with improved writing capability, which has a uniform surface roughness, and which is inexpensive to make and, preferably, even less expensive to make than prior processes, and which has additionally improved contrast, that is, readability of the recording trace.

Subject matter of the present invention

Briefly, the intermediate layer between the paper substrate carrier, and the metallized coating consists of printing ink, applied, preferably, by gravure, or intaglio printing. By printing the ink on the paper, deep toning, for example a deep black tone can be obtained with excellent contrast to the metallized surface; further, the colored layer has uniform surface roughness. Inks which are rich in fillers are particularly preferred.

In accordance with a feature of the invention, the printed layer is not applied continuously over the substrate but, rather, zones or markers are left off, thus permitting the application of markers on the recording paper. The printing speed in a rotary printing press is preferably in the range of from 5 to 9 m/sec.

The invention will be described by way of example with reference to the accompanying drawing, wherein the single FIGURE is a schematic cross-sectional view through a recording paper.

A web, or strip of paper 10 has a printed ink layer 11 applied thereto in a rotary gravure, or intaglio printing step. A metal coating 12, preferably of aluminum, is evaporated on the printing layer 11.

The printing layer 11 shows discontinuities, as seen at 13. These discontinuities are obtained by failure to etch the gravure roller in the region where a marking 13 is to appear. No printing ink will be applied on the paper strip 10 after printing at the marking region 13. Omitting printing ink at selected locations thus permits the application of markings during printing. For example, diagrams, symbols, time markers, clock traces, and the like, may be applied to a continuous web or strip, for example to a recording strip which is perforated centrally, or at the edges, for linear, or rotary transport. The intermediate layer of printing ink substantially increases the resistance to corrosion of the outer metal coating 12. Thus, by changing the intermediate printing layer, the metal coating itself can be marked during the continuous process with little additional effort. At those points where markings or symbols are to be printed, the printing roller is not etched, so that the paper does not receive printing ink at those locations.

Since the metal, if evaporated in thin layers, comparatively quickly corrodes away after having been applied by the evaporation step in those regions of the paper which are not covered with printing ink, the recording metallized paper is easily marked. It is, for example, also possible to electrically separate various zones of the metallized recording paper by forming separating lines which do not have printing ink applied, so that the metallized coating will corrode away and electrically separate the remaining coated strips. If a diagram is to be printed or applied which is to have an electrically continuous metal layer, then interrupted, self-contained markings may be applied.

Markings, or any other symbols may be additionally obtained by changing the etching depth of the gravure roller. The metallized layer will remain but, due to changes in light reflection in the regions in which the metal layer is applied to printed layers of different depths, writings or symbols are clearly visible on the metallized surface. By changing the etching of the gravure roller, the light reflection becomes more diffuse, resulting in good contrast of recognition of applied symbols.

Multi-color printing may be used, that is, the intermediate printing layer 11 may have differently colored inks, so that different markings can be clearly recognized.

To obtain contrasting coloring and a slightly rough surface, it is preferred that the printing ink is rich in fillers. Paper which is to be coated should have a relatively smooth surface on the side where the coating is to be applied, so that the quantity of ink to be applied is held low. The surface to be metallized, however, that is, where a metallic coating is to be evaporated, should not be completely smooth but should have a certain roughness since, due to diffuse light reflection the readability, that is, the contrast of the writing trace with respect to the remainder of the paper is improved. By applying printing ink by intaglio, or gravure printing, a uniform surface roughness of the ink layer is obtained. Further, the ink layer has a better uniformity of thickness than intermediate layers heretofore applied. The ink layer may have a highly visible, strong hue, much more than that which can be obtained by roller lacquer application. Particularly when using aluminium as a metallizing layer, recording is markedly better than with heretofore known layers.

Printing speeds of from about 5 to 9m/sec. may be used when gravure printing is selected as the method to apply the printing ink to the paper substrate; this contrasts with the much slower speed of, maximum, about 2m/sec. in the previously known roller lacquer application. Intaglio or gravure printing installations are compact and require less space than roller-type lacquer installations.

Various changes and modifications may be made within the scope of the inventive concept.

Suitable printing inks are intaglio printing inks, for example those manufactured by Kast & Ehinger Corp., 7 Stuttgart, Germany and flexo- or newspaper printing inks for example those manufactured by Zeller & Gmelin, Eislingen/Fils, Germany with fillers such as bitumen or soot. The ratio of filler material to ink is preferably about 55 % to 80 % by weight.

Paper having a surface smoothness of 8 microns was coated with ink to a thickness of 2 microns. The ink used was an alcohol-base intaglio printing ink, having 66% weight filler therein, resulting in a printed layer having a surface roughness of 6 microns. An aluminium layer of 0.06 micron thickness was applied thereto by vapor deposition. The types of inks preferred for use in the present invention are intaglio or newspaper printing inks having characteristics which are determined by the specific printing process, the nature of the paper base and the desired intensity of colouring as well known in the printing industry.

I claim:

1. Metallized recording paper consisting essentially of a paper substrate, (10),
  a contrasting intermediate layer (11) of intaglio or gravure printing ink on said paper substrate (10);
  and a metallized coating (12), vapor-deposited on the contrasting intermediate intaglio or printing ink layer (11) and adapted to be burned off under the action of an electrical discharge,
  wherein said intaglio or gravure printing ink of said ink layer (11) contains sufficient filler to provide a uniformly rough surface at the side facing the metallized coating (12).

2. Recording paper according to claim 1, wherein the ratio of filler material to ink is about 55% to 80%, by weight.

3. Recording paper according to claim 1, wherein the contrasting intermediate intaglio, or gravure printing ink layer (11) is applied on the paper substrate with discontinuities (13) to form markings on the paper substrate.

4. Recording paper according to claim 1, wherein the contrasting intermediate intaglio, or gravure printing ink layer (11) comprises a multi-color intaglio, or gravure printed layer.

5. Recording paper according to claim 1, wherein the metal of the metallized coating consists essentially of aluminum.

* * * * *